United States Patent [19]

Bishop

[11] Patent Number: 4,741,958
[45] Date of Patent: May 3, 1988

[54] ULTRAVIOLET CURABLE OUTER COATINGS FOR OPTICAL FIBER

[75] Inventor: Timothy E. Bishop, Algonquin, Ill.

[73] Assignee: DeSoto, Inc., Des Plaines, Ill.

[21] Appl. No.: 792,464

[22] Filed: Oct. 29, 1985

[51] Int. Cl.$^4$ .................... B32B 27/00; D02G 3/00
[52] U.S. Cl. .................... 428/394; 350/96.1; 427/12; 427/54.1; 427/165; 427/407.2; 428/392; 522/103; 522/168
[58] Field of Search .................... 525/531; 528/112; 427/12, 54.1, 165, 407.2; 428/394, 392; 522/103, 168; 350/96.1

[56] References Cited

U.S. PATENT DOCUMENTS

| | | | |
|---|---|---|---|
| 4,014,771 | 3/1977 | Rosenkranz et al. | 525/531 X |
| 4,025,692 | 5/1977 | Yamagishi et al. | 428/418 |
| 4,522,465 | 6/1985 | Bishop et al. | 427/54.1 X |

*Primary Examiner*—Theodore E. Pertilla
*Attorney, Agent, or Firm*—Dressler, Goldsmith, Shore, Sutker & Milnamow, Ltd.

[57] ABSTRACT

Buffer-coated and overcoated optical glass fiber is disclosed in which the topcoat has the high strength and high tensile modulus combined with good elongation and solvent resistance associated with extruded jacket coatings, but which is applied by ordinary coating procedures and cured by exposure to ultraviolet radiation. The coating compositions which enable this to be achieved comprise an ultraviolet curable coating composition comprising, based on total reactive components, from about 60% up to about 85% of a diepoxide polyacrylate combined with at least about 15% of an monacrylate-functional monomer having a glass transition temperature below 0° C. to provide desired coating viscosity. The diepoxide is a diglycidyl ether of a bisphenol having a molecular weight in the range of about 560 to about 2000 and contains at least 1.8 oxirane groups per molecule, substantially all of these oxirane groups being consumed in the polyacrylate.

6 Claims, No Drawings

4,741,958

ULTRAVIOLET CURABLE OUTER COATINGS FOR OPTICAL FIBER

DESCRIPTION

1. Technical Field

This invention relates to ultraviolet curable coating compositions which are adapted to be employed as an overcoating on buffer coated optical glass fiber in order to provide superior physical properties, and it includes the production of such overcoated fiber and the overcoated fiber itself.

BACKGROUND ART

Optical glass fiber is presently protected by applying to the freshly formed galss fiber a buffer coating of a resin which possesses an appropriate refractive index and a low tensile modulus which remains low at very low temperature ($-60°$ C.) to minimize the danger of microbending when such low temperatures are encountered. For rapid application and cure, coatings which cure an exposure to ultraviolet radiation are needed. Unfortunately, these buffer coatings are not very resistant to organic solvents, they lack abrasion resistance, and have inadequate resistance to applied stress.

To improve the properties of the coated optical fibers, it has been found to be desirable to topcoat the buffer coated optical glass fiber with a tough and flexible overcoat which possesses superior resistance to solvents and abrasion, and better resistance to applied stress. In order to obtain the desired properties in optical glass fibers which have been buffer coated and then topcoated, resort has been had to the use of extruded Nylon "jacket" coatings, but these are more expensive and more difficult to apply than an ultraviolet-cured coating.

It is also known to apply both coatings at high speed using an ultraviolet-curable topcoat on top of a buffer coating which has been ultraviolet cured, but the topcoats have not possessed the needed resistance to solvents and enough rupture strength without also being too rigid (having too little flexibility). As a matter of interest, by applying both coatings sequentially to freshly drawn optical glass fiber, one avoids the possibility of damaging the buffer coated fiber and achieves a considerable economy.

This invention desires to provide ultraviolet-cured topcoatings which will approximate the properties now obtained using the extruded "jacket" coatings noted above so that high speed coating procedures can be used to economically produce buffer coated and topcoated optical glass fiber which will satisfy the demanding commercial requirements which are sometimes insisted upon. The combination of moderate elongation with exceptionally high tensile modulus is particularly contemplated. At the same time, cure rate, coefficient of friction and water resistance are also important and are improved by this invention.

Prior efforts to solve the problem have usually involved combining a polyacrylate polyurethane oligomer, either alone or together with a low molecular weight epoxy diacrylate, such as Shell Chemical Company's DRH370, with an acrylate monomer of high glass transition temperature. In the absence of the epoxy diacrylate, the cure speed was inadequate. In the presence of the diacrylate, the elongation was inadequate. It is desired to combine high cure speed with good elongation.

DISCLOSURE OF INVENTION

In accordance with this invention, from about 60% up to about 85%, preferably from 65% to 80% of a diepoxide polyacrylate, preferably a diacrylate, are combined with at least about 15%, preferably at least 20%, of a monoacrylate-functional monomer having a glass transition temperature below $0°$ C., preferably below $-20°$ C., preferably an ether acrylate, to provide desired coating viscosity. These monomers may be used in an amount up to about 40%, preferably not more than 35%. It is surprising to find that such a simple combination of polymerizable components in combination with an appropriate photoinitiator will cure, on ultraviolet exposure, to provide a tensile strength of at least 2500 psi., a tensile modulus in excess of 50,000 psi., preferably in excess of 75,000 psi., in combination with an elongation of at least about 25%. These properties are measured by depositing a 3 mil test film and curing it by ultraviolet exposure to provide a free film whose properties can be measured. Rapid ultraviolet cure, low coefficient of friction and reduced water resistance are also important.

More particularly, in this invention buffer-coated optical glass fiber is overcoated with a topcoat having the exceptional tensile modulus and moderate elongation properties which have been discussed, as are now associated with extruded jacket coatings, but which is applied by ordinary coating procedures and cured by radiation exposure, preferably with ultraviolet radiation. This is done by applying to buffer-coated optical glass fiber the radiation-curable coating composition described previously, and then exposing the coated fiber to ultraviolet or other radiation to cure the same.

To provide coating compositions capable of forming films of the desired character, one must employ the polyacrylate-functional polyesters which are more particularly defined hereinafter. The prior art ultraviolet-curing topcoats are polyurethanes, and the polyesters used herein are more economical and provide many advantages. Thus, the coatings of this invention are faster curing, provide a lower coefficient of friction (film-to-film), and a reduced weight gain when exposed to moisture. The lower coefficient of friction avoids damage to the coated fiber when it is reeled and unreeled. The reduced weight gain when exposed to moisture indicates greater resistance to moisture.

The polyacrylate polyesters which have been described are combined with liquid components to provide the coating viscosity which is desired while retaining the strength and tensile modulus needed in the cured coatings. While the prior art which will be compared with hereinafter uses various polyacrylate-functional polyurethanes, it has not previously been possible to provide the specified combination of characteristics without relying upon polyurethane oligomers.

Referring first to the diepoxides which are used, these are diglycidyl ethers of a bisphenol, typically bisphenol A. The term diglycidyl ether here denotes a product having at least 1.8 oxirane groups per molecule, and substantially all of these oxirane groups are consumed in the production of the desired acrylate diester, as will be discussed. The diglycidyl ether used must have a molecular weight in the range of about 560 to about 2000, more preferably from 700 to 1200. All molecular weights herein are number average molecular weights. When the molecular weight is below the required range, the final products are too brittle. When the molecular weight is above the required range, the viscosity is excessive.

The diepoxides which have been described are esterified with an acrylic acid which is preferably acrylic acid itself. All of the epoxy functionality is consumed by reaction with a stoichiometric proportion of the acid. The esterification is a simple adduction reaction which is normally carried out by simple heating in the presence of an esterification catalyst, and is entirely conventional.

While acrylic acid itself is the acid of choice, one may also use a derivative of acrylic acid, such as an ester of acrylic acid with a lactone, such as epsilon caprolactone. As will be evident, the acrylic acid ester moiety remains to be incorporated into the epoxide diester.

The epoxide diesters which have been discussed are combined with a moderate to low glass transition temperature monoethylenically unsaturated monomer, preferably an ether acrylate. While these have been used in compositions not herein contemplated, the combination of high strength and flexibility achieved herein normally involves the use of a high glass transition temperature monomer, so the results achieved herein are especially surprising.

Many monoethylenically unsaturated monomers of low to moderate glass transition temperature are known for inclusion in radiation-curable coating compositions, albeit not to provide high strength coatings for topcoat application. The proportion in which these should be used have previously been set forth.

Suitable monomers of the type referred to above are illustrated by phenoxyethyl acrylate, ethoxyethoxy acrylate, tetrahydrofurfuryl acrylate, isobutoxyethyl acrylate, methoxyethyl acrylate, and propoxyethyl acrylate. The corresponding propyl and butyl acrylates are also contemplated, such a propoxypropyl acrylate. The preferred monomers are selected from phenoxyethyl acrylate, tetrahydrofurfuryl acrylate, and $C_2$-$C_4$ alkoxyethyl acrylates, and mixtures thereof.

Also, it is permissable to include minor amounts, up to about 15%, of low molecular weight polyacrylates, such as trimethylol propane triacrylate, or pentaerythritol triacrylate, for these also reduce the viscosity and increase strength without unduly sacrificing the needed elongatability.

Minor proportions of volatile nonreactive solvents, such as acetone or ethyl alcohol, may also be present to adjust viscosity, but this is not preferred because the rapid action needed on the fiber-forming equipment makes it difficult to volatilize away any large amount of solvent prior to ultraviolet exposure. Accordingly, the compositions contemplated herein are normally free of volatile nonreactive solvent.

The buffer coatings which may be used will vary considerably, but these are characterized by a relatively low tensile modulus at room temperature. It is because the buffer coating on the optical glass fiber has a room temperature modulus below 10,000 psi, preferably below 2,000 psi, that overcoating becomes important. Very low modulus ultraviolet-cured coatings which are usually overcoated are described in the application of R. Ansel Ser. No. 170,148 filed July 18, 1980, now U.S. Pat. No. 4,624,994. These can be described as ethylenic-terminated polyurethane, polyamide or polyurea oligomers having a molecular weight in the range of about 2000 to about 8000 and containing one amide, urea or urethane group for every 300 to 900 units of molecular weight, and containing polyalkylene polyether, polyalkylene polythiol or polyalkylene polyester in which the alkylene moiety contains 2 to 6 carbon atoms. These diacrylate oligomers are combined with 20% to 50% of the composition of a radiation-curable monoacrylate monomer having a $T_g$ below about $-10°$ C., such as phenoxyethyl acrylate, and with 2% to 20% of a monoethylenic monomer having a strong capacity for hydrogen bonding, such as N-vinyl pyrrolidone.

The radiation which will effect cure will vary with the presence or absence of a photoinitiator and its selection. In the absence of a photoinitiator, electron beam radiation can be used for cure, but this is not preferred. The usual photoinitiators enabling ultraviolet cure in acrylate-functional systems are ketonic, such as about 3% of diethoxy acetophenone. Other photoinitiators are illustrated by benzil dimethyl ketal, acetophenone, benzophenone, m-chloro acetophenone, propiophenone, thioxanthone, benzoin, benzil, anthraquinone, and the like. These may be used singly, or in mixtures, in an amount up to about 10% of the coating (usually 1-5%). Various amines may also be added to enhance the cure, such as diethyl amine, but this is not essential.

Even visible light not too remote from the ultraviolet range may be employed using appropriate photoinitiators. These are illustrated by camphor quinone and coumarin which are used together with a tertiary amine, such as triethyl amine. Diphenylbenzoylphosphine oxide is also useful in and near the ultraviolet range.

The term "polyacrylate" as used herein identifies a plurality of acrylic acid ester groups, and this is a conventional meaning for this term.

Throughout this application, including the examples and claims, all parts and proportions are by weight, unless otherwise stated. The invention is illustrated in the following comparison:

EXAMPLE 1

One mole of Epon 1001, a diglycidyl ether of bisphenol A from Shell Chemical Company having a molecular weight of about 1000, is esterified with two moles of acrylic acid to form the diacrylate ester. While an appropriate diacrylate can be made as described, it is convenient to employ a commercial diacrylate ester of a diglycidyl ether of bisphenol A from Celanese, Celrad 3701.

EXAMPLE 2

67.0 parts of the diacrylate of Example 1 are blended with 30.0 parts of phenoxyethyl acrylate and 3.0 parts of benzil dimethyl ketal (Irgacure 651 supplied by Ciba-Geigy may be used) to provide an ultraviolet curable coating composition having a room temperature viscosity of 5700 centipoises. On ultraviolet cure of a film cast on glass (using 3.5 J/cm$^2$) and removal to provide a film having a thickness of 3 mil, the cured film was found to have excellent properties for the topcoating of optical glass fiber. This conclusion is clear from the comparison tabulated below in which Composition A is a commercial urethane acrylate-epoxy acrylate mixture with a high glass transition temperature monomer formulated in accordance with U.S. Pat. No. 4,472,019, and Composition B is a polycarbonate urethane acrylate mixture with a high glass transition temperature monomer formulated in accordance with U.S. Pat. No. 4,514,037.

TABLE

| Property | Comp. A | Comp. B | Ex. 2 |
|---|---|---|---|
| Viscosity (cps.) | 6500 | 5000 | 5900 |
| 0.05 J/cm$^2$ cure %* | 84 | 62 | 89 |
| Tensile strength (psi.) | 4300 | 3900 | 3600 |
| Elongation (percent) | 24 | 70 | 40 |
| Modulus (psi.) | 100,000 | 120,000 | 130,000 |
| Rupture (in-lb./in$^3$) | 2000 | 4500 | 2500 |
| Coefficient of friction | 3.0 | 4.1 | 1.1 |
| Water weight gain** | 4.9 | 3.0 | 1.9 |

*The values reported are the percent of methyl ethyl ketone insolubles obtained at the specified UV exposure in comparison with the same insolubles obtained using an exposure of 3.5 J/cm$^2$.
**The percent of weight loss when a sample saturated with water by 48 hours immersion is dried at room temperature to constant weight.

As will be evident from the tabulated data, all of the tested compositions are well adapted to topcoat utility on optical glass fiber, but the compositions of this invention have faster cure, lower coefficient of friction and lower water absorption characteristics. In comparison with the polycarbonate polyurethane, the increase in cure speed and decrease in coefficient of friction are particularly apparent. In comparison with the commercial material, the improvement in elongation and water resistance are particularly apparent.

The overcoating of buffer-coated optical glass fiber in which the topcoat has the high strength and modulus combined with good elongation and solvent resistance associated with extruded jacket coatings, but which is applied by ordinary coating procedures and cured by exposure to ultraviolet radiation, is carried out by applying to buffer-coated optical glass fiber using conventional coating procedures well known for the liquid coating of optical fiber the ultraviolet-curable coating composition of Example 2, and then exposing the wet-coated fiber to ultraviolet light to cure the coating. The buffer coating on the optical glass fiber is of conventional physical character, having a room temperature tensile modulus below 10,000 psi.

What is claimed is:

1. An organic buffer-coated and topcoated optical glass fiber in which the topcoat is an ultraviolet-cured coating composition which, when formed into a 3 mil cured test film, has a tensile strength of at least about 2500 psi, a tensile modulus measured at room temperature of at least 50,000 psi. and an elongation at least about 25%, said composition consisting essentially of, based on total reactive components, from about 60% up to about 85% of a diepoxide polyacrylate combined with at least about 15% up to 40% of a monoacrylate-functional monomer having a glass transition temperature below 0° C. to provide desired coating viscosity, said diepoxide being a diglycidyl ether of a bisphenol having a molecular weight in the range of about 560 to about 2000 and at least 1.8 oxirane groups per molecule, substantially all of said oxirane groups being consumed in said polyacrylate.

2. A coated optical fiber as recited in claim 1 in which said buffer coating on said optical glass fiber has a room temperature tensile modulus below 10,000 psi.

3. A coated optical fiber as recited in claim 1 in which said buffer coating on said optical glass fiber has a room temperature tensile modulus below 2,000 psi.

4. An organic buffer-coated and topcoated optical glass fiber in which the buffer coating has a room temperature tensile modulus of less than 10,000 psi, and the topcoat is an ultraviolet cured coating which, in a 3 mil test film, has a tensile strength of at least about 2500 psi, a tensile modulus measured at room temperature of at least 75,000 psi. and an elongation at least about 25%, the composition of said topcoat consisting essentially of, based on total reactive components, from about 65% up to about 80% of a diepoxide diacrylate combined with 20% to 35% of monoacrylate-functional monomer selected from phenoxyethyl acrylate, tetrahydrofurfuryl acrylate, and $C_2$-$C_4$ alkoxyethyl acrylates, and mixtures thereof, to provide desired coating viscosity, said diepoxide being a diglycidyl ether of bisphenol A having a molecular weight in the range of 700 to 1200, substantially all of said oxirane groups being consumed in said diacrylate.

5. A method of topcoating buffer-coated optical glass fiber in which the topcoat has the high strength and modulus combined with good elongation and solvent resistance associated with extruded jacket coatings, but which is applied by ordinary coating procedures and cured by exposure to ultraviolet radiation comprising, applying to organic buffer-coated optical glass fiber an ultraviolet-curable coating composition as described in claim 1, and then exposing the wet-coated fiber to ultraviolet light to cure the coating.

6. A method as recited in claim 5 in which said buffer coating on said optical glass fiber has a room temperature tensile modulus below 10,000 psi.

* * * * *